Patented May 7, 1940

2,199,566

UNITED STATES PATENT OFFICE 2,199,566

VAT DYESTUFFS OF THE NAPHTHINDENONE SERIES

Karl Koeberle, Werner Rohland, and Christian Steigerwald, Ludwigshafen-on-the-Rhine, Germany, assignors to General Aniline & Film Corporation, a corporation of Delaware No Drawing. Application June 12, 1937, Serial No. 147,924. In Germany July 4, 1936

2 Claims. (Cl. 260—367)

The present invention relates to vat dyestuffs of the naphthindenone series.

We have found that new vat dyestuffs of the naphthindenone series are obtained by treating derivatives of naphthindenones having at least one reactive 6- or 7-position with alkaline agents.

A great variety of derivatives of naphthindenones may be used as initial materials provided that they contain at least one reactive 6- or 7-position. The following formula of naphthindenone illustrates the numeration of its positions:

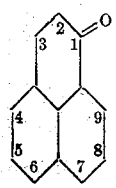

These said positions 6 and 7, which are also named peri-positions, are reactive when they contain either hydrogen alone or a radicle readily capable of being split off, as for example halogen atoms or nitro groups. For example there may be mentioned as initial materials naphthindenones having two free peri-positions and containing in the other positions of the molecule halogen atoms and/or alkyl, alkoxy, cyano, carboxyl or amino groups, and naphthindenones containing in the 6- or 7-position a halogen atom or a nitro group and if desired any further of the said atoms or atomic groups. Finally there may also be used naphthindenones containing in the 6- or 7-position a radicle incapable of being split off and having a reactive ortho-position, as for example aroyl radicles, radicles of aminoanthraquinones, aminoanthrapyrimidines, pyrazolanthrones, aminoazabenzanthrones, aminoazanthraquinones, aminopyridinoanthraquinones and aminobenzanthraquinones, and containing hydrogen or a radicle which is readily split off in the other peri-position. They may also contain any further of the said atoms or groups. Methods for the preparation of the starting materials for the purpose of the present invention are described in our copending applications, Serial No. 147,920, now U. S. Patent 2,145,051, dated Jan. 24, 1939, and Serial No. 147,922, now U. S. Patent No. 2,174,751, issued October 3, 1939.

The reaction is generally speaking carried out by heating the initial materials, if desired with an addition of diluents, such as aliphatic alcohols, with alkali metal hydroxides. Vat dyestuffs which dye vegetable and animal fibres a great variety of shades are thus obtained in excellent yields.

The following examples will further illustrate how the said invention may be carried out in practice but the invention is not restricted to these examples. The parts are by weight.

Example 1

25 parts of 2-chlornaphthindenone (prepared by acting with glycerine in the presence of sulphuric acid on 1-hydroxy-2-chlornaphthalene) are introduced at 120° C., into a solution of 160 parts of potassium hydroxide in 100 parts of ethanol, the mixture heated slowly to 140° C. and heating continued for about 2 hours while stirring continuously. The liquid is then poured into water, a current of air led through the aqueous solution and the deposited dyestuff filtered off by suction and washed with water. It dissolves in concentrated sulphuric acid giving a blue coloration and yields a pale red vat from which cotton is dyed violet shades.

Example 2

5 parts of 2-aminonaphthindenone (prepared by acting with paratoluene sulfonic acid amide on 2-chlor-naphthindenone and saponification of the paratoluene sulfonic acid naphthindenonyl amide formed) are introduced at 120° C. into a mixture of 50 parts of potassium hydroxide and 40 parts of ethanol and the mixture is heated for about 2 hours at from 140° to 150° C. It is then poured into water and the dyestuff is precipitated by leading in air, filtered off by suction and washed. It dissolves in concentrated sulphuric acid giving a green-blue coloration and dyes vegetable fibres grey shades from a pale red vat.

In a similar manner there is obtained from 2-dimethylaminonaphthindenone (prepared by reacting dimethylamine with 2-bromnaphthindenone, which latter can be obtained by brominating naphthindenone) a dyestuff which dissolves in concentrated sulphuric acid giving a blue coloration and which yields violet dyeings on cotton from a pale red vat.

Example 3

3 parts of 2-(1'-anthraquinonyl-amino)-naphthindenone (obtainable by causing 1-aminoanthraquinone to act on 2-bromnaphthindenone) are introduced into a solution, heated to 130° C., of 30 parts of potassium hydroxide in 20 parts of methanol and the mixture stirred for about 3 hours at from 140° to 150° C. It is then poured into water, air is led through the liquid and the dyestuff is filtered off by suction and washed. It dissolves in concentrated sulphuric acid giving a blue-green coloration and yields olive-green dyeings from a violet vat.

In a similar manner there is obtained from 2-(2'-anthraquinonyl-amino)-naphthindenone (prepared by reacting 2-aminoanthraquinone with 2-brom-naphthindenone) a dyestuff which dissolves in concentrated sulphuric acid giving an olive-green coloration and which yields grey dyeings from a violet vat. From 2-pyrazolanthronylnaphthindenone (prepared by reacting 1.9-pyrazoloanthrone with 2-brom-naphthindenone) there is obtained a dyestuff which dissolves in concentrated sulphuric acid giving a reddish violet coloration and which yields a blue-green vat from which cotton is dyed yellow-red shades.

If 2-(5'-anthrapyrimidylamino)-naphthindenone (prepared by reacting 5-aminoanthrapyrimidine with 2-brom-naphthindenone) be treated in the manner described in the first paragraph of this example, a dyestuff is obtained which dissolves in concentrated sulphuric acid giving a green coloration and which dyes cotton violet-grey shades from a violet vat.

Example 4

45 parts of 2,6-(di-1'-anthraquinonylamino)-naphthindenone (obtainable by causing 2 molecular proportions of 1-aminoanthraquinone to act on one molecular proportion of 2,6-dibromo-naphthindenone which may be prepared by causing bromine to act on 2-brom-naphthindenone) are introduced into a solution, heated to 120° C., of 450 parts of potassium hydroxide in 350 parts of ethanol, the mixture being heated for some hours at from 135° to 145° C. It is then allowed to cool and is poured into water, the dyestuff being precipitated by leading in air, filtered off by suction and washed. It dissolves in concentrated sulphuric acid giving a red-brown coloration and dyes cotton olive-green shades from a red-brown vat.

If 2,6-dipyrazolanthronylnaphthindenone (prepared by reacting two molecular portions of 1,9-pyrazoloanthrone with one molecular proportion of 2,6-dibromnaphthindenone) be treated in the manner described, a dyestuff is obtained which dissolves in concentrated sulphuric acid giving a red-brown coloration and which dyes vegetable fibres yellow-brown shades from a green vat.

Example 5

10 parts of 2-(1'-anthraquinonylamino)-6-pyrazolanthronylnaphthindenone (obtainable by causing one molecular proportion of 1,9-pyrazoloanthrone to act on one molecular proportion of 2-chlor-6-brom-naphthindenone and reacting the 2-chlor-6-pyrazolanthronylnaphthindenone formed with one molecular proportion of 1-aminoanthraquinone, the 2-chlor-6-bromnaphthindenone itself being prepared by acting with bromine on 2-chlor-naphthindenone) are introduced into a solution, heated to 120° C., of 50 parts of potassium hydroxide in 40 parts of ethanol, the mixture being stirred for 3 hours at from 140° to 150° C. The whole is then allowed to cool and poured into water; the dyestuff is precipitated by means of air, filtered off by suction and washed. It dissolves in concentrated sulphuric acid giving a blue coloration and dyes vegetable fibres violetish grey shades from a green vat.

Example 6

3 parts of benzoylnaphthindenone (obtainable by the reaction of naphthindenone with benzoyl chloride in the presence of pyridine) are introduced into a solution, heated to 110° C., of 30 parts of potassium hydroxide in 30 parts of methanol. The mixture is stirred for about 2 hours at from 120° to 140° C., allowed to cool and poured into water. The dyestuff is precipitated by means of air, filtered off by suction and washed. It dissolves in concentrated sulphuric acid giving a blue coloration and dyes vegetable fibres yellow shades from a pale red vat.

Example 7

5 parts of 2-chlor-6-(1'-anthraquinonylamino)-naphthindenone (prepared by causing one molecular proportion of 1-aminoanthraquinone to act on one molecular proportion of 2-chlor-6-brom-naphthindenone) are introduced into a mixture, heated to 115° C., of 25 parts of potassium hydroxide and 20 parts of methanol, the mixture being heated for 2½ hours at from 130° to 145° C. while stirring. After cooling, it is added to water and the dyestuff is precipitated by means of air, filtered off by suction and washed with water. It dissolves in concentrated sulphuric acid giving a violet-red coloration and dyes vegetable fibres green shades from a violet vat.

In a similar manner there is obtained from 2-chlor-6-pyrazolanthronylnaphthindenone (prepared by reacting one molecular proportion of 1,9-pyrazoloanthrone with one molecular proportion of 2-chlor-6-brom-naphthindenone) a dyestuff which dissolves in concentrated sulphuric acid giving a blue-green coloration and which dyes vegetable fibres blue shades from a violet vat.

What we claim is:

1. A vat dyestuff of the peri-naphthindenone series corresponding to the general formula:

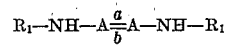

in which A is the radical of a peri-naphthindenone, $R_1$ an anthraquinone radical, and $a$ and $b$ represent direct linkages between the peri-positions of the naphthindenone radicals shown.

2. The vat dyestuff of the peri-naphthindenone series having the formula:

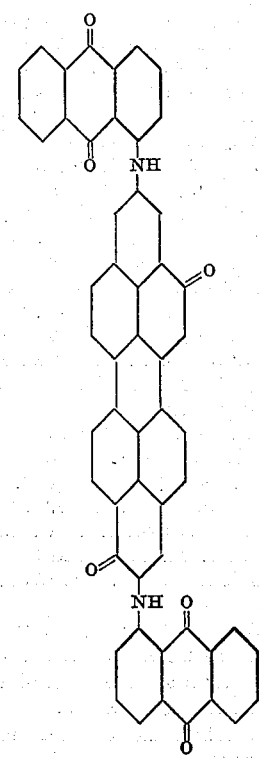

KARL KOEBERLE.
WERNER ROHLAND.
CHRISTIAN STEIGERWALD.